(12) United States Patent
Simon et al.

(10) Patent No.: US 9,487,430 B2
(45) Date of Patent: Nov. 8, 2016

(54) POLYGONAL TIP PLATE MODULE AND BUSHING ASSEMBLY COMPRISING SUCH MODULES

(71) Applicant: 3B-Fibreglass sprl, Battice (BE)

(72) Inventors: Philippe Simon, Battice (BE); Dimitri Laurent, Battice (BE); Utku Ahmet Özden, Aachen (DE); Christoph Broeckmann, Aachen (DE); Alexander Bezold, Aachen (DE)

(73) Assignee: 3B-Fibreglass sprl, Battice (BE)

( * ) Notice: Subject to any disclaimer, the term of this patent is extended or adjusted under 35 U.S.C. 154(b) by 0 days.

(21) Appl. No.: 14/410,356

(22) PCT Filed: Jun. 13, 2013

(86) PCT No.: PCT/EP2013/062285
§ 371 (c)(1),
(2) Date: Dec. 22, 2014

(87) PCT Pub. No.: WO2013/189832
PCT Pub. Date: Dec. 27, 2013

(65) Prior Publication Data
US 2015/0368144 A1 Dec. 24, 2015

(30) Foreign Application Priority Data
Jun. 21, 2012 (EP) .................................... 12172856

(51) Int. Cl.
*C03B 37/083* (2006.01)
*C03B 37/08* (2006.01)

(52) U.S. Cl.
CPC ............. *C03B 37/083* (2013.01); *C03B 37/08* (2013.01)

(58) Field of Classification Search
CPC ............................. C03B 37/083; C03B 37/08
USPC .......................................... 65/494, 495, 497
See application file for complete search history.

(56) References Cited

U.S. PATENT DOCUMENTS

| 4,330,312 A * | 5/1982 | Hill ....................... C03B 37/095 65/492 |
| 4,941,903 A * | 7/1990 | Jensen .................. C03B 37/083 65/498 |
| 2003/0205067 A1 * | 11/2003 | Arterburn ............... C03B 37/08 65/471 |

FOREIGN PATENT DOCUMENTS

| FR | 2922884 A1 | 5/2009 |
| WO | 9812147 A1 | 3/1998 |
| WO | 9958460 A1 | 11/1999 |
| WO | 0001630 A1 | 1/2000 |
| WO | 2009128749 A1 | 10/2009 |

* cited by examiner

*Primary Examiner* — Alison L Hindenlang
*Assistant Examiner* — Mohamed K Ahmed Ali
(74) *Attorney, Agent, or Firm* — Avery N. Goldstein; Blue Filament Law PLLC

(57) ABSTRACT

The present invention concerns a tip plate module for use in a bushing assembly for the production of glass fibers, said tip plate module comprising side walls surrounding at least a portion of the perimeter of a tip plate (11) forming the floor of the module, said tip plate forming a convex polygon, characterized in that, said polygonal tip plate comprises at least five edges (N≥5), preferably at least six edges (N≥6), more preferably it comprises six edges (N=6). The present invention also concerns a bushing assembly comprising at least one such tip plate module.

20 Claims, 4 Drawing Sheets

POLYGONAL TIP PLATE MODULE AND BUSHING ASSEMBLY COMPRISING SUCH MODULES

TECHNICAL FIELD

The present invention relates to glass fibre manufacturing equipment. In particular it concerns a bushing assembly providing efficient reinforcement of the tip plates with a design permitting to reduce the amount of expensive alloys used for its manufacturing.

BACKGROUND OF THE INVENTION

Glass fibres can be produced by melting a glass composition in a melter and drawing them out through the tip plate of a bushing assembly. A bushing assembly is generally in the form of a rectangular box with two pairs of opposite side and end walls forming the perimeter thereof with an opening at the top in fluid communication with the melter. The bottom floor comprises a tip plate which is a plate comprising a multitude of orifices or tips through which the glass melt can flow to form fibres, which are attenuated to reach their desired diameter. To ensure an optimal control of the glass melt viscosity, the temperature of the tip plate must be controlled accurately. The temperature of the tip plate depends on the glass melt composition but is generally well above 1000° C. Because of the extreme working conditions, the various components of a bushing assembly are made of platinum or platinum alloys, typically rhodium-platinum alloys.

The load applied on the tip plate is substantial with, on the one hand, the weight of the glass melt lying on top of it and, on the other hand, the drawing force applied to the fibres below. At temperatures well above 1000° C., it is not surprising that tip plates are sensitive to creep and sagging. In order to increase the production rate, larger tip plates with more numerous tips are being used which increase the problem of creep and sagging. For this reason, beside the use of transverse gussets distributed along the length of the tip plate, a longitudinal central stiffening rib is often provided in the centre of the floor to stiffen the tip plate in the longitudinal direction; this configuration corresponds to having two tip plates in parallel separated by a longitudinal beam in a single bushing assembly. Usually, the two tip plate portions and the central beam are made of a single plate folded appropriately. The central beam may, however, be welded to the centre of the top surface of a single tip plate or to the longitudinal edges of two separate tip plates. Examples of bushing assemblies comprising a central stiffening rib, dividing the floor of the bushing assembly into two tip plates are disclosed in WO2000/001630, WO2009/128749, WO9958460, or EP0931026.

When a bushing assembly is worn out, it must be dismounted, and replaced by a new one. The old bushing assembly can be dismantled, cleaned and a new bushing assembly built using the precious metal thus recovered. Such operation is expensive and requires highly qualified operators. The service time of a bushing is therefore of great economical concern. On the other hand, although recycled, the precious metals used for manufacturing a new bushing assembly are so expensive, that the amount of such materials used in the manufacturing should be minimized.

The present invention provides a new design for bushing assemblies, allowing an efficient reinforcement of the tip plates and excellent homogenization of the molten glass while reducing the amount of expensive alloys used for its manufacturing. This and other advantages of the present invention are presented in continuation.

SUMMARY OF THE INVENTION

The present invention is defined in the appended independent claims. Preferred embodiments are defined in the dependent claims. In particular, the present invention concerns a tip plate module for use in a bushing assembly for the production of glass fibres, said tip plate module comprising side walls surrounding at least a portion of the perimeter of a tip plate forming the floor of the module, said tip plate forming a convex polygon, characterized in that, said polygonal tip plate comprises at least five edges (N≥5), preferably at least six edges (N≥6), more preferably it comprises six edges (N=6). In geometry, a "convex polygon" is defined as a polygon such that any line drawn through the polygon (and not tangent to an edge or corner) meets its boundary exactly twice. Equivalently, all the interior angles of a convex polygon are less than 180°. The angles of the polygonal tip plate are all preferably at least 90 deg and less than 180 deg, preferably all the angle are comprised between 100 and 160 deg. The polygon is preferably cyclic, which in geometry refers to polygons having all its corners lying on a single circle. The polygon formed by the tip plate is not necessarily regular, but it is preferred that the N edges of the polygonal tip plate all have a length, $L_i$, comprised within ±20% of the mean value of the lengths of the polygon edges, $L_{mean} = \Sigma L_i/N$, with i=1 to N.

A tip plate module according to the present application preferably comprises a ceiling resting on the tops of the side walls of the module. At least one, but not all the side walls of the module preferably comprise a screen, a grid, or a mesh, to bring the interior of the module in fluid communication with a source of glass melt. The tip plate polygon preferably comprises at least a pair of two parallel edges, at least one edge of said pair of parallel edges preferably comprising no side wall on at least a portion of said edge. This allows two or more such tip plate modules to be aligned in a straight line to form a continuous inner volume defined by the side walls of each module.

The present invention also concerns a bushing assembly comprising at least one tip plate module as discussed above. Preferably, the bushing assembly comprises first and second tip plate modules sharing a common edge, said edge being devoid of a side wall on at least a portion thereof. As discussed above, if said common edge is parallel to an opposite edge of both first and second tip plates, several such tip plate modules can be aligned along a straight line. In a preferred embodiment a first and second tip plate modules are separated by a stiffening rib. In such embodiment, each tip plate module may further comprise a ceiling resting on the tops of the side walls thereof, and wherein the stiffening rib forms the floor of a distribution manifold bringing in fluid communication through screens, grids, or meshes the interior of each module with an upstream source of molten glass which floor is formed by the ceilings of each module.

When at least two tip plate modules are aligned, sharing a common edge to form a first tip plate assembly extending along a longitudinal direction, and at least two other tip plate modules are aligned, sharing a common edge to form a second tip plate assembly extending along a longitudinal direction, these first and second tip plate assemblies can be arranged side by side, separated from one another by said manifold extending parallel to the alignment of said two assemblies of at least two tip plate modules. The manifold would define two separate fluid communication paths to the first and second tip plate assemblies. The manifold could thus be in fluid communication with an upstream source of molten glass through a grid, screen or mesh and be in fluid communication downstream with each of the first and second tip plate assemblies through a grid, screen or mesh which is an integral part of the side walls of each module adjacent said manifold. The stiffening rib forming the floor of the manifold advantageously defines a top ridge facing the interior of the manifold, said ridge being comprised within a plane parallel to said longitudinal direction and normal to the plane formed by the tip plates, and forming a non-straight line, preferably forming at least one "V". The portion of the stiffening rib structure forming the floor of the manifold is usually made of metal and the bottom surface thereof is preferably supported by a core made of refractory material, said refractory material core preferably comprising further external stiffening metal supports

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1:
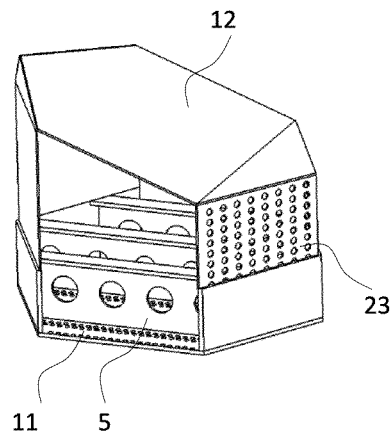
FIG. 1: shows a hexagonal tip plate module according to the present invention.

As illustrated in FIG. 1, a tip plate module according to the present invention comprises side walls surrounding a portion only of the perimeter of a tip plate (11) forming the floor of the module, said tip plate forming a convex polygon, characterized in that, said polygonal tip plate comprises at least five edges (N≥5), preferably at least six edges (N≥6), more preferably it comprises an even number of edges, typically it comprises six edges (N=6) as illustrated in FIG. 1. All the angles of a convex polygon are per definition smaller than 180 deg. They are preferably all greater than 90 deg. They are preferably comprised between 100 and 160 deg. The objective is to get the tip plate geometry closest to a circle, since a circle yields the greatest resistance to creep, because the distance of any point of the edge to the geometrical centre is shortest in a circle. For this reason, it is preferred that the polygon be a cyclic polygon, i.e., such that all its corners lie on a single circle. Hexagonal tip plates are advantageous, because their geometry, afford dense alignment of several such tip plates both side by side and in an opposed configuration, separated by a stiffening rib (21) (cf. FIG. 3). It is preferred that the tip plate comprises at least a pair of two parallel edges, at least one edge of said pair of parallel edges preferably comprising no side wall on at least a portion of said edge. This way, several tip plate modules can be aligned on a straight line to form a tip plate assembly (1A, 1B). FIG. 4(a) illustrates two such tip plate assemblies (1A, 1B) coupled to one another by the intermediate of a stiffening rib (21).

Figure 4:
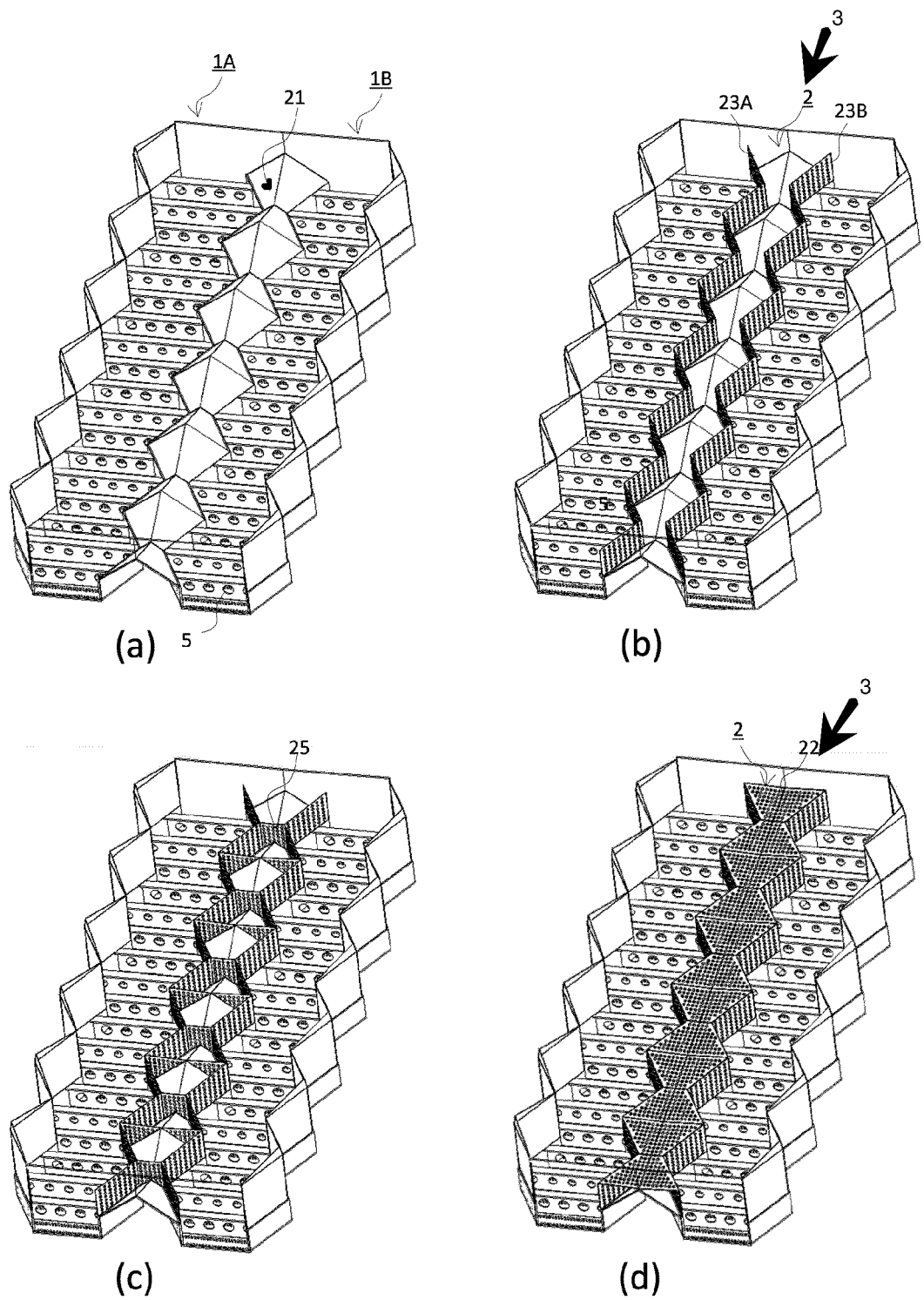
FIG. 4: shows a bushing assembly according to the present invention comprising several hexagonal tip plate modules as illustrated in FIG. 2, arranged side by side in two rows separated by a stiffening rib structure with addition of successive screens to define a manifold.
Figure 5:
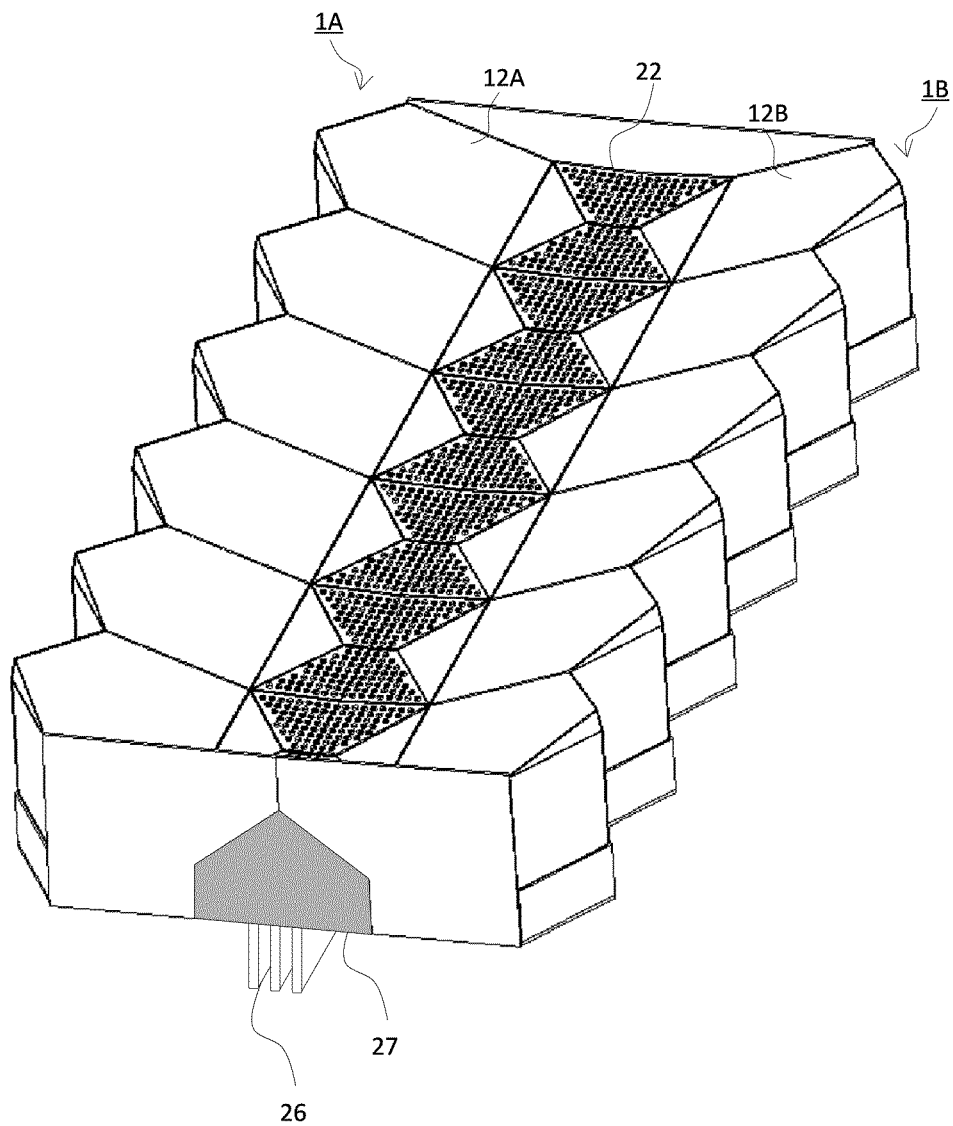
FIG. 5: shows a view of the completed bushing assembly of FIG. 4.

A tip plate module according to the present invention preferably comprises a ceiling (12) resting on the tops of the side walls of the module. At least one, but not all the side walls of a module may comprise a screen, a grid, or a mesh (23). The embodiment illustrated in FIG. 1, comprises a hexagonal tip plate having at least two parallel edges, surrounded by four side walls arranged adjacent two by two, each pair of adjacent walls being separated by said at least two parallel edges. The top portion of one pair of adjacent side walls comprise a screen (23) allowing the flow of glass melt therethrough. To further reinforce the tip plate against creep, gussets (5) can be coupled to the top surface (facing inside the module) of the tip plate (11). It further comprises a ceiling (12) which use will be discussed below. With two edges devoid of a side wall the module illustrated in FIG. 1 is suitable for forming a tip plate assembly (1A, 1B) as illustrated in FIG. 4(a) which is not ending the alignment. The tip plates forming the ends of a tip plate assembly must comprise a single edge devoid of side wall. In case a bushing assembly consists of a single tip plate module according to the present invention, then all the edges of the tip plate should be surrounded by side walls. In most applications, a large number of tips are required to yield a high production rate, and it is quite seldom that a bushing assembly would comprise a single tip plate module. In most cases, a bushing assembly according to the present invention will comprises several such tip plate modules as illustrated in FIGS. 4 and 5.

Figure 2:
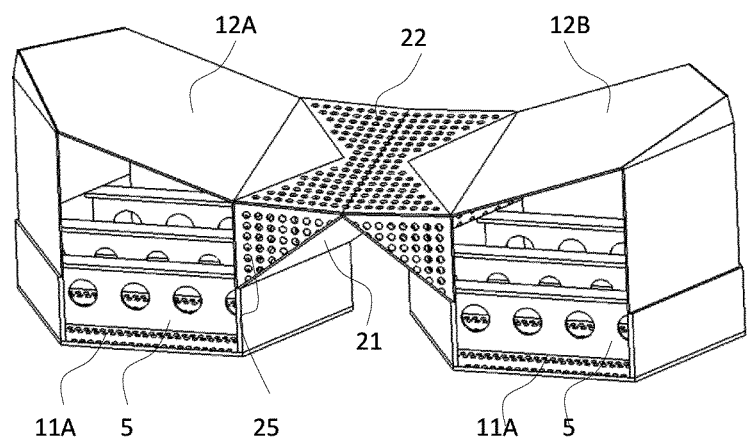
FIG. 2: shows a pair of opposite hexagonal tip plate modules separated by a stiffening rib forming the floor of a manifold.

FIG. 2 illustrate a sub-unit of a preferred embodiment of bushing assembly according to the present invention. It consists of two tip plate modules as illustrated in FIG. 1 coupled to one another by a manifold (2) which floor forms a stiffening rib (21). It can be seen in FIG. 2 that the ceilings (12A, 12B) of each module form a slope going down towards the inlet of the central manifold (2), which preferably comprises a screen (22) which helps mixing and homogenizing the composition and temperature of the glass melt, by disrupting the flow thereof. The sloped ceilings (12A, 12B) help drive the flow towards the manifold and ensure there are no dead corners wherein glass melt stagnates. From the interior of the manifold (2) the glass melt can access either module through a screen (23) not visible in FIG. 2, but illustrated in FIG. 1. It can be seen that the openings of the manifold comprised between two tip plate modules, the stiffening rib (21) and the top screen (22) may also comprise a screen (25) to further homogenize the glass melt by further disrupting the flow thereof. FIG. 4(c) shows how screens (25) are disposed in an assembly of several such units aligned along two parallel longitudinal awes.

Figure 3:
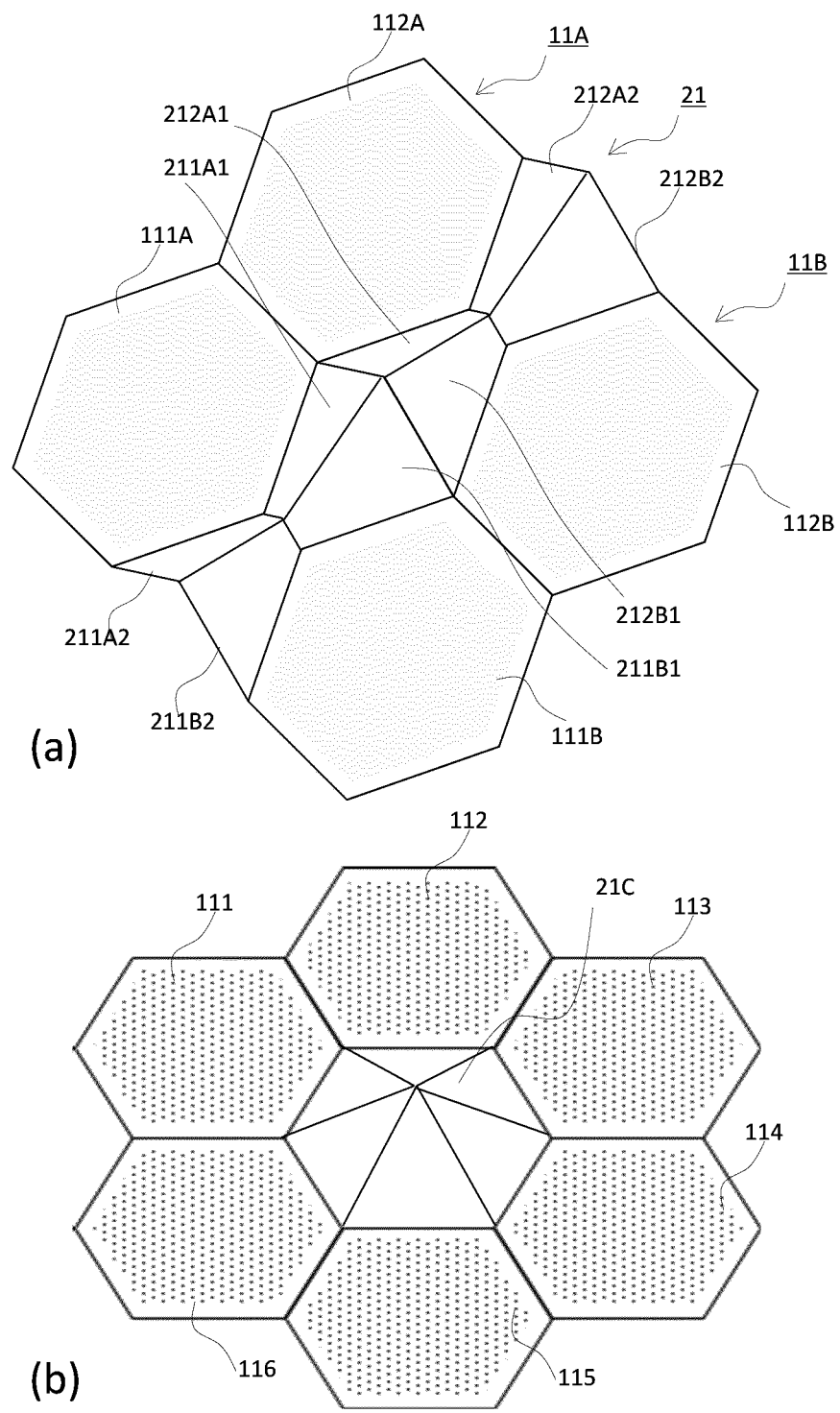
FIG. 3: shows embodiments of arrangements of tip plate modules to form the floor(s) of a bushing assembly according to the present invention.

FIG. 3(a) shows how two pairs of modules as illustrated in FIG. 2 can be coupled side by side (the side walls are not shown for sake of clarity). By thus coupling the modules, a first and second tip plate assemblies (1A, 1B) are formed, each comprising at least two tip plates (111A, 112A) and (111B, 112B) sharing one edge in common. Said edge is preferably parallel to another edge of each tip plate sharing said edge, such that several tip plate modules can be thus aligned forming a straight line, as illustrated in FIG. 4(a). The stiffening rib can have different geometries, partly imposed by the polygonal shape of the tip plates. For example, as illustrated in FIG. 3, the stiffening rib structure may have a jagged upper ridge and be composed of flat panels (211A1&2, 212A1&2) and (211B1&2, 212B1&2)

extending from each edge of the hexagonal tip plates facing towards the manifold. Since two adjacent edges meeting at an apex of a first hexagonal tip plate (111A) facing towards the manifold (2), two non-parallel panels (211A1, 211A2) are coupled to said first tip plate and form a concave edge extending from said apex to the ridge of the stiffening rib and thus form a V-shaped ridge. A corresponding second tip plate (111B) belonging to the second tip plate assembly (1B) also comprises a pair of panels (211B1, 211B2) extending from the two adjacent edges of the tip plate (111B) facing towards the manifold and thus form a V-shaped ridge through which the pairs of panels of the first and second tip plates (111A, 111B) are coupled. Coupling side by side in a row several such pairs of first and second tip plates (112A, 112B) yields the floor of a preferred bushing assembly according to the present invention. This multi-faceted stiffening rib not only reinforces the bushing floor against creep but also contributes to a further splitting the flow of glass melt before it reaches the two tip plate assemblies (1A, 1B), though screens (23A, 23B) (cf. FIG. 4(b)).

FIG. 3(b) illustrates an alternative arrangement of six hexagonal tip plate modules (111-116) around a central, hexagonal manifold which floor forms a stiffening shield (21C), thus forming a beehive structure. The capacity of the bushing assembly can be increased by adding a second stiffening shield, e.g., sharing the adjacent free ends of tip plates (113) and (114) and arranging four additional tip plate modules around said second stiffening shield, and so on. The central stiffening shield is preferably raised towards the interior of the manifold, forming e.g., a hexagonal pyramid, to drive and distribute the glass melt flow towards each tip plate (111-116).

FIG. 4 shows different embodiments of bushing assemblies according to the present invention. Each successive Figure (a) to (d) of FIG. 4 comprises additional features compared with the preceding ones. As shown in FIG. 4(a) two tip plate assemblies (1A, 1B) are formed by aligning along a longitudinal direction several tip plate modules coupled two by two by a common edge parallel to the other edges shared by two tip plates, to thus form a straight line. The two tip plate assemblies (1A, 1B) are coupled by means of a stiffening rib (21) as discussed with respect to FIG. 3(a). By adding a ceiling (12A, 12B) on top of the assembly, said ceiling comprising an opening or screen (22) to bring the interior of the bushing assembly In fluid communication with a source of glass melt, an operational bushing assembly is thus obtained.

FIG. 4(b) shows that a manifold (2) can be formed by adding side screens (23A, 23B) at the side walls of each tip plate module which are adjacent to the stiffening rib (21), thus forming the lateral communication paths of the manifold (2) towards each of the first and second tip plate assemblies (1A, 1B). Cross screens (25) may be added transverse to the side screens (23A, 23B) as shown in FIG. 4(c) to further split the glass melt flow, but also to further stiffen the structure. The jagged edge of the stiffening rib drives the flow of glass melt in the longitudinal direction. FIG. 4(d) shows completion of the manifold (2) comprising a floor formed by the stiffening rib (21), side wall pervious to glass melt, formed by screens (23A, 23B) and closed on top by a top screen (22). FIG. 5 shows the bushing assembly with sloping ceilings (12A, 12B) closing the top of the tip plate modules forming the first and second tip plate assemblies to drive the flow of glass melt towards the top screens (22) and therethrough, down into the manifold (2). As shown in FIG. 5, the bottom surface of the stiffening rib may further be reinforced by a refractory material core (27) filling the space defined between the first and second tip plate assemblies (1A, 1B) and the stiffening rib (21). Said refractory core may further be reinforced by external stiffening metal supports (26).

Finite elements modelling has revealed that a bushing assembly according to the present invention allows the saving of considerable amounts of precious material compared with a traditional bushing assembly design of same capacity, comprising two rectangular tip plates separated by a rib. Table 1 compares features between such traditional bushing assembly of 6000 tips and the preferred embodiment illustrated in FIGS. 4&5 with twelve hexagonal tip plate modules of 529 tips each, arranged in two tip plate assemblies (1A, 1B) of six tip plate modules disposed on either side of a central manifold (2) which floor forms a stiffening rib.

TABLE 1 features of the present invention compared with a traditional design

| | conventional design: two rectangular tip plates separated by a stiffening rib | invention according to FIGS. 4&5, with hexagonal tip plates. | difference (inv-prior art)/inv |
|---|---|---|---|
| total number of tips | 6000 | 6348 | +5.5% |
| total volume of precious metal | 654.7 cm$^3$ | 569.6 cm$^3$ | −14.9% |
| tip plate max sagging | 2.27 mm | 2.13 mm | −6.6% |

With the original design of the tip plate module of the present invention comprising a polygonal tip plate (11) having at least 5 edges, preferably six edges or more, and preferably forming a cyclic polygon, a bushing assembly with higher creep resistance than henceforth achieved can be obtained. A cyclic polygon yields an intrinsically higher resistance to creep as its geometry approaches the one of a circle, i.e., as the number, N, of edges increases towards infinite. On the other hand, as the number of edges increases, it becomes difficult to align several such tip plates to obtain a dense arrangement of tips. For this reason it was found that hexagonal tip plates offered a good compromise between high resistance to creep and high density of tips. A bushing comprising a central manifold separating two tip plate assemblies (1A, 1B), each composed of a series of tip plate modules aligned along a longitudinal axis, as represented in FIGS. 4 and 5, allow bushing assemblies with high numbers of tips to be produced with less precious metal and yielding higher resistance to creep than henceforth achieved. Alternative arrangements of the tip plate modules for forming the floor of a bushing assembly can, however, be imagined, such as represented in FIG. 3(b) wherein six hexagonal tip plate modules (111-116) are arranged around a central stiffening shield (21C), which can form the floor of a manifold (2). Several such arrangements can be aligned side by side to increase the capacity of the bushing assembly by increasing the number of tips.

The invention claimed is:

1. A tip plate module for use in a bushing assembly for the production of glass fibres, said tip plate module comprising side walls surrounding at least a portion of the perimeter of a tip plate forming the floor of the module, said tip plate forming a convex polygon, characterized in that, said tip plate formed in the shape of a convex polygon comprises at least five edges (N>5).

2. The tip plate module according to claim 1, wherein the angles of the polygonal tip plate are all at least 90 deg and less than 180 deg.

3. The tip plate module according to claim 1, further comprising a ceiling resting on the tops of the side walls of the module.

4. The tip plate module according to claim 1, wherein at least one, but not all the side walls comprise a side screen, a grid, or a mesh.

5. The tip plate module according to claim 1, wherein the tip plate comprises at least a pair of two parallel edges, at least one edge of said pair of parallel edges comprising no side wall on at least a portion of said edge.

6. A bushing assembly comprising at least one tip plate module according to claim 1.

7. The bushing assembly according to claim 6, wherein at least two tip plate modules share a common edge, said edge comprising no side wall on at least a portion thereof.

8. The bushing assembly according to claim 6, wherein at least two tip plate modules are separated by a stiffening rib.

9. The bushing assembly according to claim 8, wherein each tip plate module comprises a ceiling resting on the tops of the side walls thereof, and wherein the stiffening rib forms the floor of a distribution manifold bringing in fluid communication through screens, grids, or meshes the interior of each module with an upstream source of molten glass which floor is formed by the ceilings of each module.

10. The bushing assembly according to claim 9, comprising a first and second tip plate assemblies extending along a longitudinal direction, arranged side by side, and each surrounded by side walls and end walls and, the first and second tip plate assemblies being separated from one another by said manifold extending along said longitudinal direction and defining two separate fluid communication paths to the first and second tip plate assemblies, wherein each tip plate assembly comprises at least two tip plate modules.

11. The bushing assembly according to claim 10, wherein the manifold is in fluid communication with the upstream source of molten glass through a grid, screen or mesh, and is in fluid communication downstream with each of the first and second tip plate assemblies through side grids, screens or meshes which are an integral part of the side walls of each module adjacent said manifold.

12. The bushing assembly according to claim 10, wherein the stiffening rib forming the floor of the manifold defines a top ridge facing the interior of the manifold, said ridge being comprised within a plane parallel to said longitudinal direction and normal to the plane formed by the tip plates, and forming a non-straight line.

13. The bushing assembly according to claim 12, wherein the portion of the stiffening rib structure forming the floor of the manifold is made of metal and the bottom thereof is supported by a core made of refractory material.

14. The bushing assembly according to claim 6, comprising six hexagonal tip plate modules arranged side by side sharing an edge in common two by two around a hexagonal central shield in a beehive manner.

15. The tip plate module according to claim 2 wherein all the angles are between 100 and 160 deg.

16. The tip plate module according to claim 2 wherein the polygon is cyclic.

17. The bushing assembly according to claim 10 wherein the first and second tip plate assemblies each comprise a hexagonal tip plate, and all tip plate modules of a given tip plate assembly being coupled two by two along the longitudinal direction by an edge common to each pair of tip plates, said common edge being parallel to an opposite edge of each tip plate.

18. The bushing assembly according to claim 14, wherein the central shield forms the floor of a hexagonal central glass melt distribution manifold.

19. The tip plate module according to claim 1 wherein said polygonal tip plate comprises six edges (N=6).

20. The bushing assembly according to claim 6, wherein the at least one tip plate module is according to claim 19.

* * * * *